United States Patent
Hsieh et al.

(10) Patent No.: US 7,499,992 B1
(45) Date of Patent: Mar. 3, 2009

(54) ASSOCIATION TRAVERSAL TRANSLATION FOR COMMON INFORMATION MODEL

(75) Inventors: Kevin T. Hsieh, San Jose, CA (US); Martine B. Wedlake, Hillsboro, OR (US); Todd W. Bates, Portland, OR (US); Krishna Harathi, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/038,002

(22) Filed: Feb. 27, 2008

(51) Int. Cl.
*G06F 15/173* (2006.01)
*G06F 12/00* (2006.01)

(52) U.S. Cl. ...................... 709/223; 719/328
(58) Field of Classification Search ........... 709/223, 709/224, 217, 218; 719/328, 315, 317
See application file for complete search history.

(56) References Cited

U.S. PATENT DOCUMENTS

| | | | |
|---|---|---|---|
| 5,842,220 A | 11/1998 | De Groot et al. | |
| 5,887,193 A * | 3/1999 | Takahashi et al. | 710/8 |
| 6,134,552 A | 10/2000 | Fritz et al. | |
| 6,611,915 B1 | 8/2003 | Kubik et al. | |
| 7,380,249 B2 * | 5/2008 | Hudis et al. | 719/316 |
| 7,428,597 B2 * | 9/2008 | Beunings | 709/238 |
| 2004/0068732 A1 * | 4/2004 | Brumme et al. | 719/315 |
| 2004/0199566 A1 | 10/2004 | Carlson et al. | |
| 2005/0177836 A1 * | 8/2005 | Lari et al. | 719/315 |
| 2006/0271711 A1 | 11/2006 | Palapudi et al. | |

FOREIGN PATENT DOCUMENTS

WO    WO03009177 A1    1/2003

* cited by examiner

*Primary Examiner*—Zarni Maung
(74) *Attorney, Agent, or Firm*—MaxValueIP, LLC

(57) ABSTRACT

One example of this invention defines a new interface to the CIM client API that is more generic than the current standard CIM client API that clients can use for the case where they want to find all relationships between instances of A and B. The method would implement several different ways to retrieve the relationships between A and B. CIM has a concept of a qualifier, which is a tag that can be applied to supply any additional information. The provider could define in the qualifier for each association class which algorithm they think is most efficient, and the implementation of the new interface would use whichever algorithm the qualifier says will be most efficient.

1 Claim, 2 Drawing Sheets

ASSOCIATION TRAVERSAL TRANSLATION FOR COMMON INFORMATION MODEL

BACKGROUND OF THE INVENTION

The Common Information Model (CIM) is a standard set of classes and methods that are used to manage distributed systems. Classes can be viewed as two types: "regular" classes and association classes. "Regular" classes can be used to represent any object in a distributed system, such as a disk drive, volume, server, or switch. Association classes are used to represent relationships between objects.

As an example, let us assume that CIM_StorageVolume is a class representing the volume and CIM_StoragePool represents the pool of storage that the volume is allocated from. CIM_AllocatedFromStoragePool is a class representing the relationship between the volume and the pool. So if there is an instance sv1 of CIM_StorageVolume that is allocated from instance sp1 of CIM_StoragePool, then there would be an instance afsp1 that represents that relationship.

CIM provides methods to access the class object model. The simplest method is enumerateInstances, which enumerates all instances of a particular class. The method associators starts at a particular instance and returns all instances of related "regular" objects. For example, calling associators on sp1 with a result class of CIM_StorageVolume would return {sv1, sv2, sv3, sv4} if volumes sv1, sv2, sv3, and sv4 were created from sp1. The method references starts at a particular instance and returns all instances of related association objects. For example, calling references on sp1 with a result class of CIM_AllocatedFromStoragePool would return {afsp1, afsp2, afsp3, afsp4}.

A Storage Resource Manager (SRM) is an application that manages distributed systems, often using the CIM standard to communicate with all of the systems in a network. A "provider" is an implementation specific to each system which provides the data requested by the SRM.

A very common operation in CIM client applications is to find all relationships between instances of one class (we will call it class A) and another class (we will call it class B). However the CIM/WBEM (Web-Based Enterprise Management) interface does not define foreign keys like databases. In order to define these relationships, CIM defines another type of class called an association class, which we will call AB. A common client algorithm would be to enumerate instances of A, and then for each A, call the associators method to get all related instances of B via the AB class. This will scale as O(a*b), where a is the number of instances of class A, and b is the number of instances of class B.

Furthermore, the efficiency of the CIM provider for the AB class will vary based on implementation. The CIM client will have no information regarding the efficiency of the implementation. For example, the provider may have to do some extra work to match instances of A and B, which makes the looping algorithm even more redundant. Or there may be many more instances of A than B, in which case it would be more efficient to start the enumeration from instances of B rather than instances of A.

The only current solution is for the client to try different algorithms and see what happens. They could communicate with the provider developers to try to gain some insight on what algorithms would be more efficient, but there is no automated way to use the most efficient algorithm.

SUMMARY OF THE INVENTION

One embodiment of this invention defines a new interface to the CIM client API that is more generic than the current standard CIM client API that clients can use for the case where they want to find all relationships between instances of A and B. The method would implement several different ways to retrieve the relationships between A and B. CIM has a concept of a qualifier, which is a tag that can be applied to supply any additional information. The provider could define in the qualifier for each association class which algorithm they think is most efficient, and the implementation of the new interface would use whichever algorithm the qualifier says will be most efficient.

Three examples of implementations:

1) Enumerate all instances of A, and for each instance of A, call associator to B. This would result in 1+A calls to the CIM agent, which would work well if there were few instances of A.

2) Enumerate all instances of B, and for each instance of B, call associator to A. This would result in 1+B calls to the CIM agent, which would work well if there were few instances of B.

3) Enumerate all instances of A, B, and AB, and then match them locally on the client side. This would result in 3 calls to the CIM agent, which would work well if there are lots of instances of both A and B, but not so many that they would take up too much memory storing them all in the client.

DETAILED DESCRIPTION OF THE PREFERRED EMBODIMENTS

The new client method would need to take as input parameters the source class name (A), association class name (AB), target class name (B), and references to hash tables to store the data.

Figure 1:
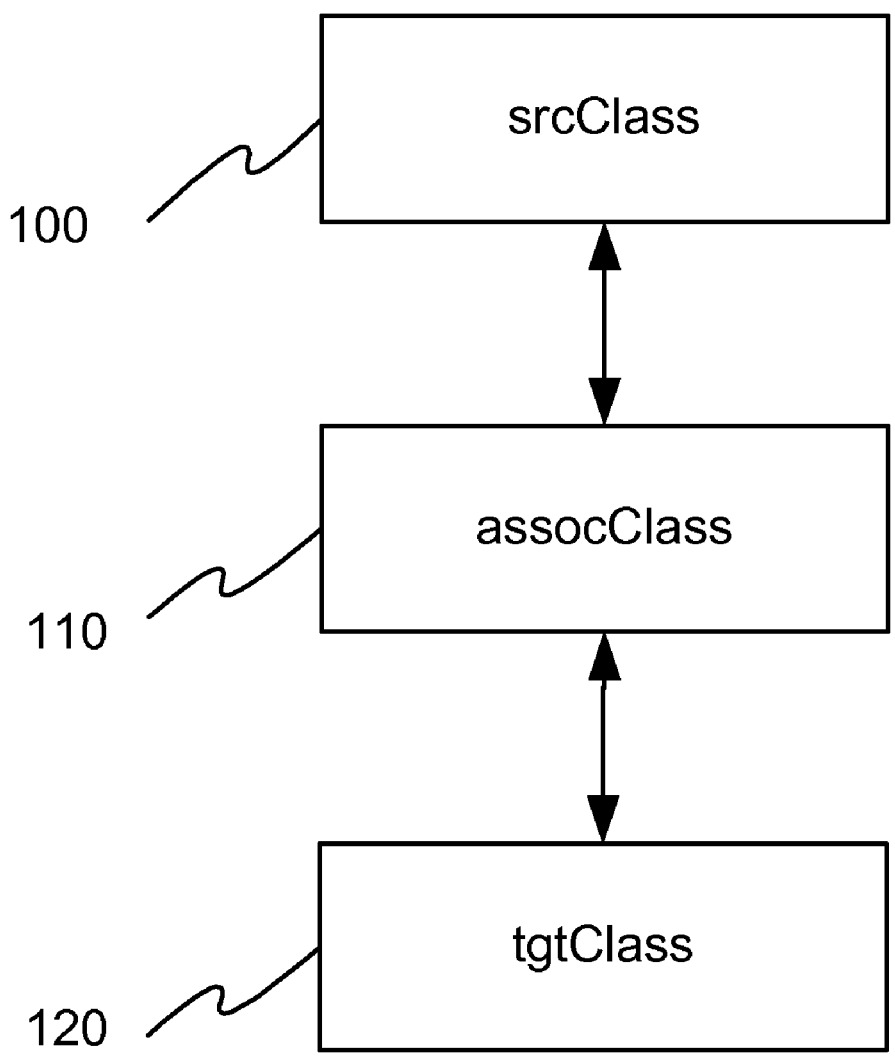
FIG. 1 is a schematic diagram of the system

FIG. 1 is a depiction of the Source Class (100) accessing the target Class (120) through the Associate Class (110).

Figure 2:
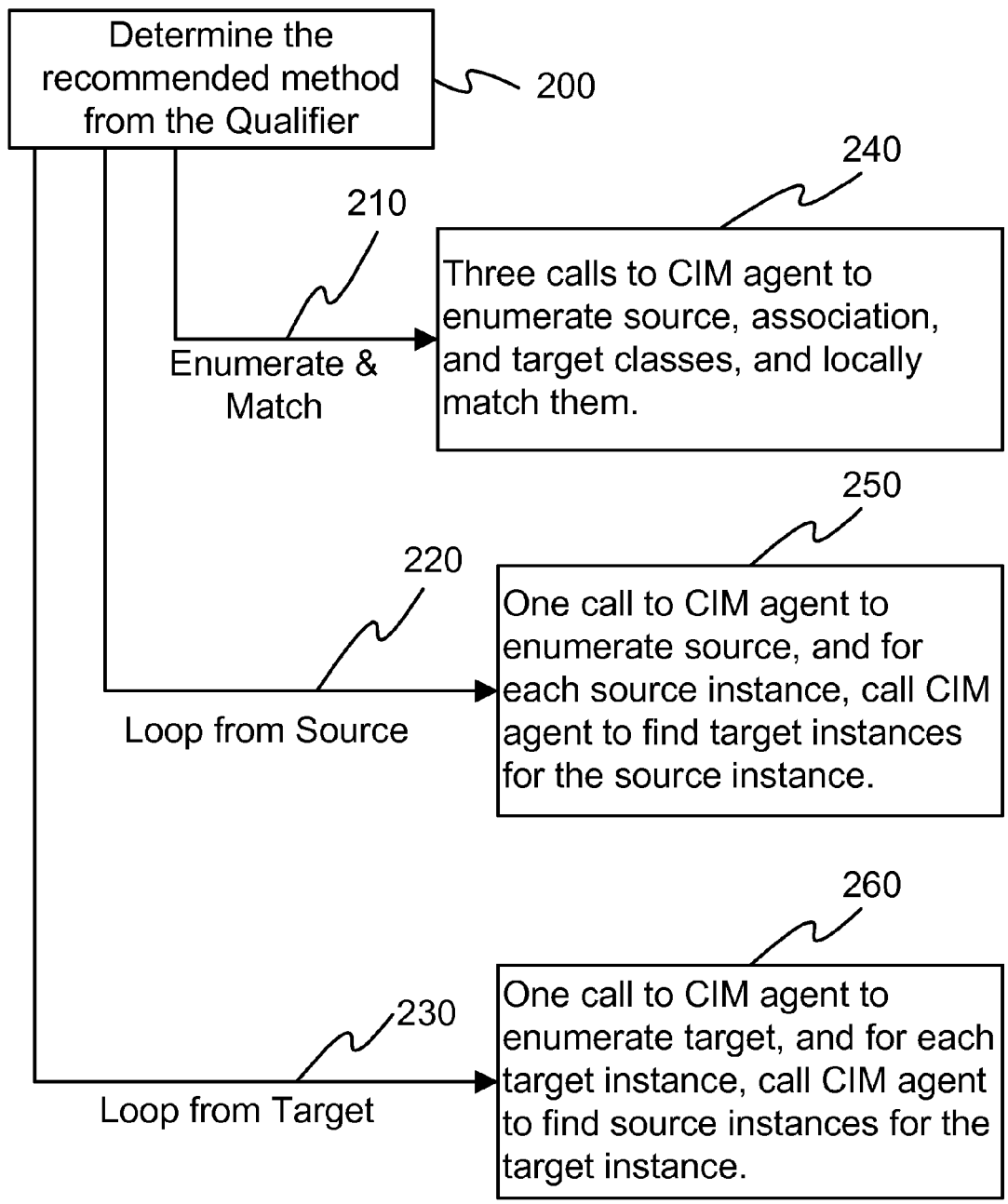
FIG. 2 is a flow diagram of the system

FIG. 2 is a depiction of the flow diagram of an embodiment of the invention. The recommended client algorithm qualifier (200) recommends a way to traverse from one end-point of the association to the other (240), such as Enumerate & Match (210), Loop form Source (220), and Loop form Target (230). Based on the recommended method (210, 220, and 230), CIM agent is called at various times to enumerate the relationship between the instances of source and target classes (240, 250, and 260, respectively).

For example, in Java, an example of the method is shown in Listing 1:

Listing 1:
/**
*Finds relationships between instances of srcClassName and
  tgtClassName via the assocClassName association class
*
*@param srcClassPath—The source endpoint class in the association
  *relationship

*@param assocClassPath—The association class
*@param tgtClassPath—The target endpoint class in the association
*relationship
*@param srcKeyedData—If not null, will be filled with data.
*The key will be CIMObjectPath references to instances of
*srcClassPath. The value will be a Vector. The first element of
*the Vector will be the CIMInstance of the srcClassPath. The
*second element will be a Vector of the associated CIM-Instances
*of the assocClassPath. The third element will be a Vector of the
*associated CIMInstances of the tgtClassPath.
*@param tgtKeyedData—If not null, will be filled with data.
*The Hashtable will be filled just like srcKeyedData, except that
* the src and tgt are reversed.
*/
public void getRelatedObjects(
CIMObjectPath srcClassPath,
CIMObjectPath assocClassPath,
CIMObjectPath tgtClassPath,
Hashtable srcKeyedData,
Hashtable tgtKeyedData)

Additional input parameters might be defined for roles. A new qualifier could be defined in the association class as in the example in Listing 2:

Listing 2:
// The RecommendedClientAlgorithm qualifier defines the recommended
// way to traverse from one endpoint of the association to the other.
// The valid values are EnumAndMatch, LoopFromSrc, and LoopFromTgt
   Qualifier RecommendedClientAlgorithm: string=null,
   Scope(association);
[Association, Version ("2.8.0"),
RecommendedClientAlgorithm("EnumAndMatch"),
Description (
"Association between IBMTSDS_ExtentPool and"
"IBMTSDS_Volume."
"It is strongly recommended that this be treated as a generic"
"AllocatedFromStoragePool association rather than a vendor or"
"device specific association.")]
class IBMTSDS_AllocatedFromExtentPool: CIM_AllocatedFromStoragePool {
[Key, Override ("Antecedent"), Description ("The ExtentPool.")]
IBMTSDS_ExtentPool REF Antecedent;
[Key, Override ("Dependent"), Description ("The Volume.")]
IBMTSDS_Volume REF Dependent;
};

A client application that uses the getRelatedObjects method would not need to know what is happening under the covers. The implementation of getRelatedObjects would check the RecommendedClientAlgorithm qualifier of the association class and call the appropriate sequence of standard CIM methods.

In an embodiment of this invention, using a sequence of enumerateInstances calls and matching them locally (instead of looping with associator calls) is abstracted away from the CIM client, thus providing a way for the client to automatically take advantage of the provider's knowledge of what algorithms would be most efficient.

An embodiment of the invention is a method of providing an association traversal translation for Common Information Model, the method is comprised of:

Providing a client interface for enumerating the relationships between all instances of a first class and all instances of a second class in a hash table, wherein the first class is a regular Common Information Model class and the second class is also a regular Common Information Model class. Wherein the client interface receives an identifier of the first class, an identifier of the second class, and an identifier of an association class.

Applying a qualifier to the association class (e.g., by the provider developer).

The client implementation corresponds to the client interface which provides multiple association enumeration methods. Moreover, the qualifier identifies a first method of the multiple association enumeration methods.

The client implementation determines the first method by querying the qualifier of the association class identified by the identifier of the association class received by the client interface which the client implementation corresponds to; furthermore, the client implementation performs enumeration of the relationships for the client interface.

The multiple association enumeration methods comprise of a source-enumeration method, a target-enumeration method, and an all-enumeration method. The source-enumeration method comprises of: enumerating all instances of the first class, and calling a first associator method for each instance of the first class to the second class. The target-enumeration method comprises of: enumerating all instances of the second class, and calling a second associator method for each instance of the second class to the first class. The all-enumeration method comprises of: enumerating all instances of the first class, enumerating all instances of the second class, enumerating all instances of the association class, and matching each instance of the association class with an instance of the first class and an instance of the second class, wherein the instance of the association class represents an association between the instance of the first class and the instance of the second class. Above calls for enumerations are performed through CIM agent, and therefore not requiring a change in CIM Object Manager.

A system, apparatus, or device comprising one of the following items is an example of the invention: CIM, classes, volume, pool, qualifier, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of modeling and class management.

Any variations of the above teaching are also intended to be covered by this patent application.

The invention claimed is:

1. A method of providing an association traversal translation for Common Information Model, said method comprising:

providing a client interface for enumerating relationships between all instances of a first class and all instances of a second class in a hash table which is stored in a first storage system;

wherein said first class is of a type of regular Common Information Model class, and said second class is of a type of regular Common Information Model class;

wherein said client interface receives an identifier of said first class, an identifier of said second class, and an identifier of an association class;

applying a qualifier to said association class;

a client implementation corresponding to said client interface providing multiple association enumeration methods;

wherein said qualifier identifies a first method of said multiple association enumeration methods;

said client implementation determining said first method by querying said qualifier of said association class identified by said identifier of said association class received by said client interface which said client implementation corresponds to;

said client implementation performing enumeration of said relationships for said client interface;

wherein said multiple association enumeration methods comprises a source-enumeration method, a target-enumeration method, and an all-enumeration method;

wherein said source-enumeration method comprises: enumerating all instances of said first class, and calling a first associator method for each instance of said first class to said second class;

wherein said target-enumeration method comprises: enumerating all instances of said second class, and calling a second associator method for each instance of said second class to said first class; and wherein said all-enumeration method comprises: enumerating all instances of said first class, enumerating all instances of said second class, enumerating all instances of said association class, and matching each instance of said association class with an instance of said first class and an instance of said second class, wherein said instance of said association class represents an association between said instance of said first class and said instance of said second class.

* * * * *